(No Model.) 2 Sheets—Sheet 1.

H. W. McCLURE.
HAY AND STRAW BURNER.

No. 322,737. Patented July 21, 1885.

WITNESSES:
Fred. G. Dieterich
Wm. Fecher

INVENTOR.
Hay W. McClure
by Louis Bagger & Co.
ATTORNEYS.

(No Model.) 2 Sheets—Sheet 2.
H. W. McCLURE.
HAY AND STRAW BURNER.
No. 322,737. Patented July 21, 1885.
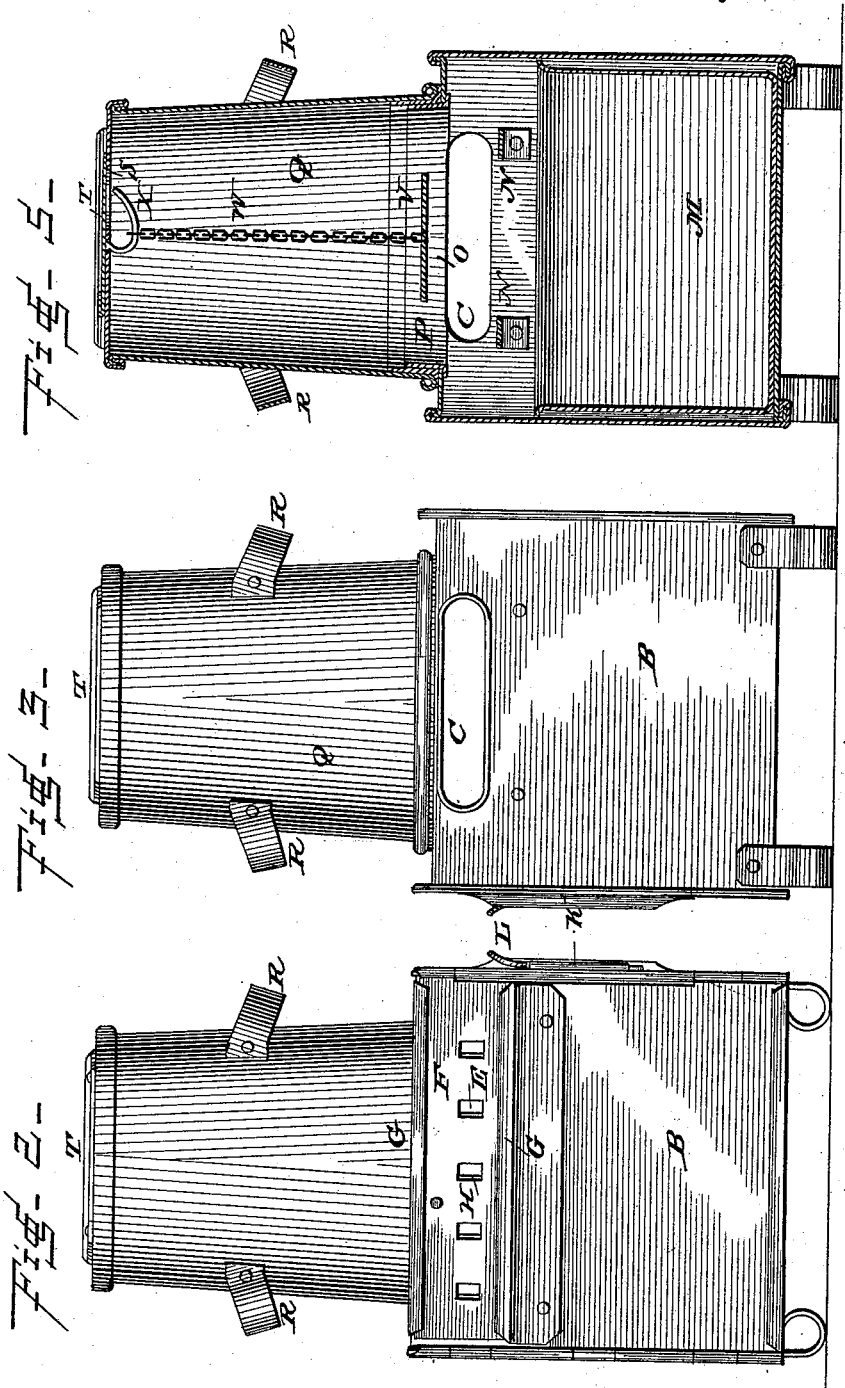
WITNESSES: INVENTOR.

UNITED STATES PATENT OFFICE.

HAY W. McCLURE, OF INMAN, NEBRASKA.

HAY AND STRAW BURNER.

SPECIFICATION forming part of Letters Patent No. 322,737, dated July 21, 1885.

Application filed May 3, 1884. (No model.)

*To all whom it may concern:*

Be it known that I, HAY W. McCLURE, a citizen of the United States, and a resident of Inman, in the county of Holt and State of Nebraska, have invented certain new and useful Improvements in Hay and Straw Burners; and I do hereby declare that the following is a full, clear, and exact description of the invention, which will enable others skilled in the art to which it appertains to make and use the same, reference being had to the accompanying drawings, which form a part of this specification, and in which—

Figure 1:
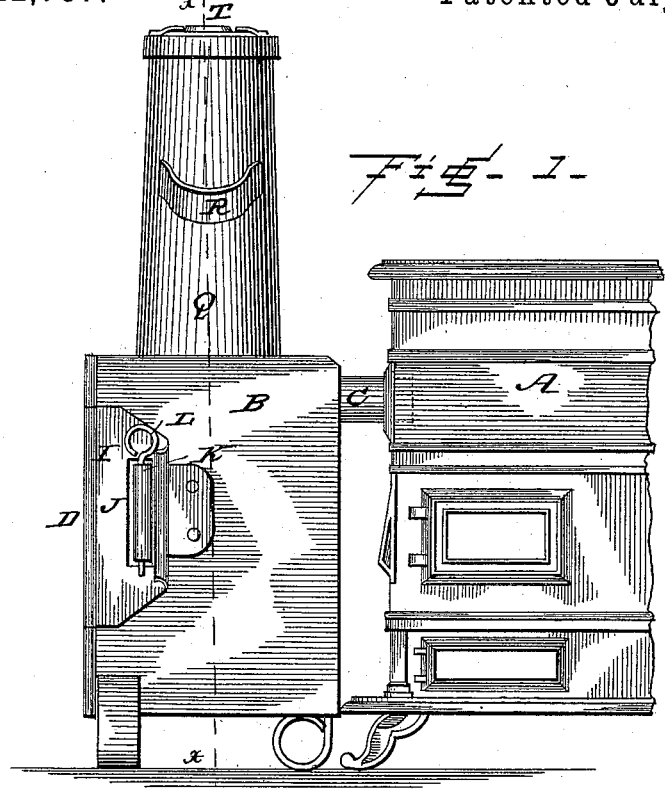
Figure 4:
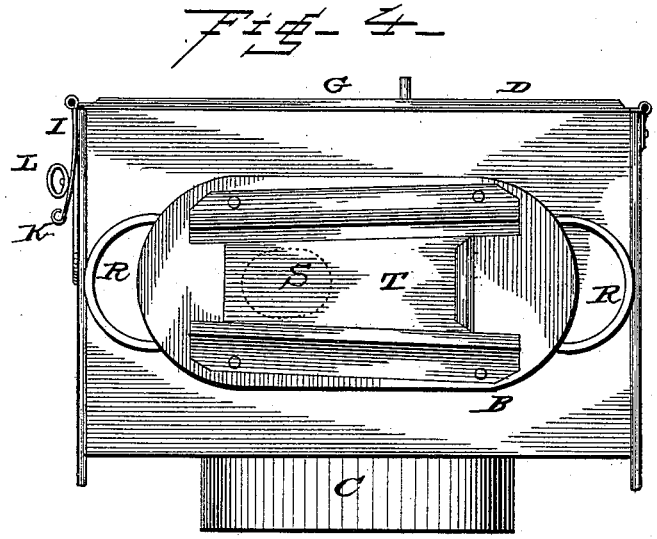

Figure 1 is a side view of a portion of a stove showing my improved hay and straw burning attachment in position. Fig. 2 is a front view of the attachment. Fig. 3 is a rear view. Fig. 4 is a top view, and Fig. 5 is a vertical section on line $x\ x$, Fig. 1.

Similar letters of reference indicate corresponding parts in all the figures.

My invention has relation to attachments for stoves for the purpose of burning hay, straw, or similar material; and it consists in the improved construction and combination of parts of the same, as hereinafter more fully described and claimed.

In the accompanying drawings, the letter A indicates a portion of a stove of the usual construction, and B indicates a rectangular casing having a pipe, C, extending from the upper end of its rear side. The forward side of the casing is open and provided with a hinged door, D, the upper portion of which has a series of perforations, E, which may be covered by a damper-plate, F, sliding in ways G at the upper end of the door, and provided with a series of perforations, H, registering with the perforations in the door. The free edge of the door is provided with a slotted plate, I, hinged to the middle of the said edge, and fitting with its slot J over a vertical tubular catch, K, upon which it may be retained by a pin or bolt, L, fitting in the tubular catch. An ash-pan, M, occupies the greatest portion of the inside of the rectangular casing, and above the ash-pan are secured two or more grate-bars, N, forming a shallow basket under an aperture, O, in the top of the casing, having an upright flange, P, around it.

Q is the straw-receptacle, which is of a shape similar to the shape of a common wash-boiler, with the exception that it is slightly tapering toward the upper end, which in a boiler would be the bottom. This receptacle is provided with handles R upon its sides, and fits with its mouth around the upright flange upon the top of the casing, and the top of the receptacle has a perforation, S, which may be covered by a sliding damper-plate, T, which slides in longitudinal ways U upon the top. A weight, V, is secured to the lower end of a chain, W, which may be attached at its upper end upon a hook, X, upon the under side of the top of the receptacle. It will now be seen that the rectangular casing may be placed in front of an ordinary stove with its pipe opening into the fire-place of the stove, when the receptacle may be filled with hay, straw, or similar material, the weight resting upon the top of the said material, when the receptacle may be placed in position upon the top of the rectangular casing and the material ignited, when it will be seen that the weight will force the material downward, allowing it to fall into the basket formed by the grate-bars, which are sufficiently separated to allow the ashes of the burned material to fall freely into the ash-pan, the damper upon the top of the receptacle allowing draft to pass downward through the material, preventing it from burning up into the material, and thus heating the receptacle, while the draft-apertures in the door draw the flame to pass into the stove, heating the same. It will also be seen that the tapering shape of the receptacle will allow the material to fall freely into the fire-basket, and that the weight will assist in feeding it, and at the same time be prevented from dropping into the fire when all the material has been consumed by being attached to the chain.

Having thus described my invention, I claim and desire to secure by Letters Patent of the United States—

1. In a straw-burning attachment for stoves, the combination of a rectangular casing having a pipe in the upper end of its rear side adapted to enter the fire-place of a stove, and having an aperture in its top provided with an upright flange, and provided upon one side with a tubular catch, with a door hinged at one edge of the open forward side of the casing, having a slotted plate hinged at its free end adapted to catch over the tubular catch, and provided with a series of perforations near its upper edge, and forming transverse ways near the said edge, a damper-plate sliding in the transverse ways and having perforations registering with the perforations in the door, an ash-pan fitting in the lower portion of the casing, grate-bars forming a shallow basket at the upper portion of the casing, a tapering receptacle fitting upon the flanged aperture of the casing, and having a perforation in its top and longitudinal ways upon the upper side of the same, a damper-plate sliding in the said ways, and a weight suspended by a chain from the top of the receptacle, as and for the purpose shown and set forth.

2. The combination, with a stove, of a straw-burning combustion-chamber having a grate in its upper portion, a wide pipe extending from above said grate into the fire-place of the stove, draft-apertures in its front side above the grate, and a large ash-receptacle, and a straw-receptacle opening into the top of the combustion-chamber, as and for the purpose shown and set forth.

In testimony that I claim the foregoing as my own I have hereunto affixed my signature in presence of two witnesses.

HAY W. McCLURE.

Witnesses:
C. D. KEYES,
AMOS TROTH.